United States Patent [19]

Blonder

[11] Patent Number: 4,828,358

[45] Date of Patent: May 9, 1989

[54] TESTING IN THE MANUFACTURE, OPERATION, AND MAINTENANCE OF OPTICAL DEVICE ASSEMBLIES

[75] Inventor: Greg E. Blonder, Summit, N.J.

[73] Assignee: American Telephone and Telegraph Company, AT&T Bell Laboratories, Murray Hill, N.J.

[21] Appl. No.: 163,903

[22] Filed: Mar. 3, 1988

[51] Int. Cl.[4] .............................................. G02B 6/36
[52] U.S. Cl. .............................. 350/96.15; 350/96.10; 356/359
[58] Field of Search ............... 350/96.15, 96.17, 96.12, 350/96.13, 96.14; 356/359, 399, 400

*Primary Examiner*—William L. Sikes
*Assistant Examiner*—Akm E. Ullah
*Attorney, Agent, or Firm*—Peter A. Businger

[57] ABSTRACT

To facilitate testing in the manufacture, operation, and maintenance of substrate-supported assemblies such as, e.g., optical transmitters and receivers in subscriber-loop and local-area networks, an assembly is provided with built-in optical test features at selected test points. Preferred test features may include side-by-side couplers or reflector taps as may serve to extract or insert light into a substrate-supported waveguide. Testing may further involve the use of a test set having optical components in alignment with test features of an assembly.

15 Claims, 2 Drawing Sheets

TESTING IN THE MANUFACTURE, OPERATION, AND MAINTENANCE OF OPTICAL DEVICE ASSEMBLIES

1. Technical Field

The invention is concerned with articles or assemblies including a substrate-supported waveguide as used, e.g., in optical communications, and, more specifically, with the testing of such articles or assemblies in the course of manufacture, operation, and maintenance.

2. Background of the Invention

As optical communications are gaining entry into the fields of subscriber-loop and local-area networks, increased attention is being paid to the feasibility of substrate-supported waveguides as forming predefined optical paths in couplers and between optical component devices such as, e.g., light sources and detectors on a common substrate—in integrated as well as in hybrid assemblies. Since waveguides can be made having dimensions on the order of micrometers, and since such waveguides may serve to interconnect devices measuring on the order of millimeters or less, the number of optical component devices on a substrate can be large, and a resulting assembly, including devices and waveguides, can provide considerable functional complexity.

In view of such complexity, and in the interest of quality control and adequate field, commercial manufacture of optical device assemblies requires assurance of proper functioning and interaction of components at various stages of the manufacturing process; also, in the case of hybrid assemblies, alignment of component with respect to waveguides may require checking. Furthermore, once an assembly has been packaged and installed, there remains a continuing need for periodic verification of performance during operation and servicing. Due, however, to the minuteness and delicacy of components and interconnecting waveguides in an optical device assembly, difficulties arise with testing as attempts are made at bringing test sets into proximity with assemblies to be tested. Also, further difficulties arise out of the need for alignment between a test set and a device assembly.

The invention as described in the following is motivated by a desire to overcome such difficulties and to facilitate testing for quality assurance and verification of performance of optical communications device assemblies and similar articles.

SUMMARY OF THE INVENTION

In accordance with the invention, test features are included at selected test points of an article which comprises a substrate-supported waveguide adapted for the transmission of energy in the form of light, "light" or "optical radiation" being understood as referring to visible light as well as to infrared energy. Test features are included as ancillary, subsidiary, or secondary to primary device features, such primary features being included to perform a function in accordance with specifications.

Preferred test features facilitate optical access to a substrate-supported device or waveguide, and access may serve for extraction or insertion of optical radiation out of or into a waveguide or device; preferred features facilitate the monitoring of optical radiation, e.g., with respect to intensity, wavelength, or phase-monitored radiation either representing a portion of radiation otherwise of interest, or else being generated for test purposes only.

Where the use of included test features involves human interaction as, e.g., in the course of preventive maintenance or during trouble shooting in the field, interaction may be facilitated by a test set which is readily aligned with an encapsulated article to be tested, and which provides for optical communication with test features of the article. Also, testing can be automated and may take place periodically, in the course of operation, at time intervals measured in seconds or less.

DETAILED DESCRIPTION

Articles of the invention include a substrate-supported waveguide and a device such as, e.g., a light source, detector, or coupler as may be included in integrated form (i.e., as fabricated in-situ and as resulting from layer deposition and patterning) or as may have been fabricated separately for subsequent attachment, e.g., in alignment optical with a substrate-supported waveguide (resulting in a so-called hybrid assembly or article). Thus, operation of an article involves light propagating in a substrate-supported waveguide, light emission and detection typically being by opto-electronic devices such as, e.g., semiconductor lasers and photodetectors.

Furthermore, articles of the invention may include non-optical devices such as, e.g., transistors and electrical circuitry. While functional testing of non-optical electrical and electronic devices may be carried out electrically, functioning of such devices may be monitored, in accordance with the invention, as based on observation of light controlled by such devices. Indeed, optical features may be included in an otherwise non-optical article expressly for the sake of convenience of testing.

Figure 1:
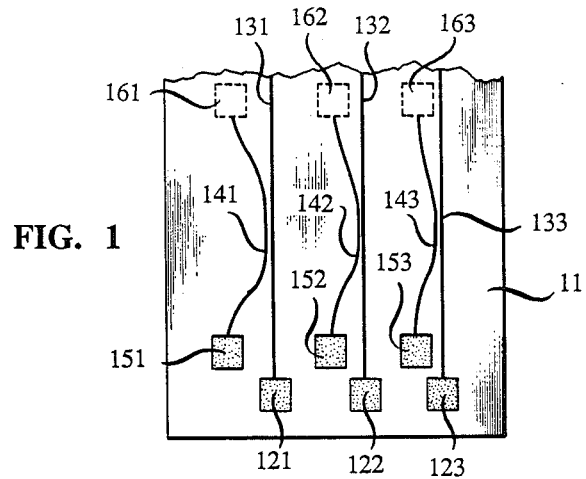
FIG. 1-3 are schematic representations of articles including test features in accordance with the invention.

Representative preferred embodiments of the invention are described as follows:

FIG. 1 shows substrate 11 and optical component devices 121, 122, and 123, the present choice of three devices being understood as representative of any plurality of devices. Also, for the sake of the following discussion, such component devices are understood to be photodetectors. Shown further are substrate-supported waveguides 131, 132, and 133 optically aligned with respective component devices 121, 122, and 123, substrate supported waveguides 141, 142, and 143 in evanescent-field (side-by-side) coupling relationship with respective waveguides 131, 132, and 133, and optical detectors 151, 152, and 153 optically aligned with respective waveguides 141, 142, and 143.

Manufacture of an article as depicted in FIG. 1 may involve the use of an essentially single-crystal silicon substrate on which waveguides may be produced, e.g., by a method involving substrate oxidation, phosphosilicate glass deposition, waveguide definition by selective removal of phosphosilicate glass, smoothing of waveguides by heating, and silica cladding glass deposition as disclosed in a U.S. patent application Ser. No. 07/163,687 designated as C. H. Henry—R. A. Levy 8-12, "Device Including a Substrate-supported Optical Waveguide, and Method of Manufacture". Optical alignment of devices with waveguides may be facilitated by substrate surface features such as, e.g., preferentially etched V-grooves as disclosed in a U.S. patent application Ser. No. 07/163,686 designated as G. E. Blonder 10, "Device Including a Component in Alignment with a Substrate-supported Waveguide".

Optical detectors 151, 152, and 153 are included for the sake of providing a test capability, e.g., in the course of manufacture, permitting positive verification of light traveling in each of the waveguides 131, 132, and 133 at a significant instance of manufacture. For example, after placement of detectors 121, 122, and 123 on substrate 11, it may be desired to verify the capability of such detectors to sense light arriving via waveguides 131, 132, and 133. Such verification may involve causing light to travel in waveguides 131, 132, and 133 towards respective detectors 121, 122, and 123. Then, if light is sensed, e.g., by detector 151, and if there is no indication of light reaching detector 121, it may be concluded that detector 121 is defective or improperly aligned with waveguide 131. With respect to economy it is noted that, while it may appear as costly to provide for individual test detectors (151, 152, 153) for each optical component (121, 122, 123) for which a test capability is desired, it is readily possible to use less expensive components in the test circuitry as compared with components to be tested.

FIG. 1 further illustrates the possibility of providing similar verification means for light sources (rather than detectors as considered above). More specifically, if devices 121, 122, and 123 are lasers or light-emitting diodes, and if detectors 161, 162, and 163 are in optical alignment with waveguides 141, 142, and 143, light reaching, e.g., detector 161 indicates that light source 121 is operational.

Figure 2:
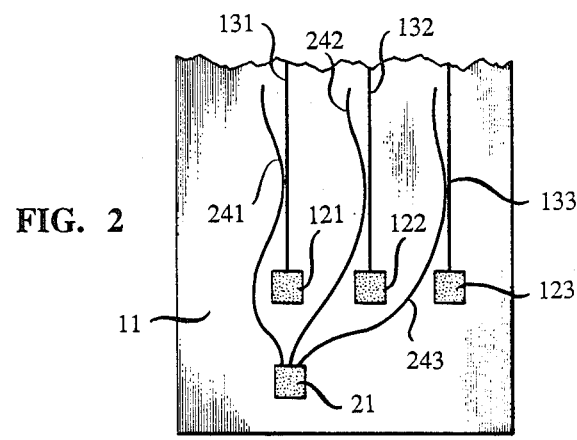

As an alternative to the use of multiple test detectors as provided for in the embodiment shown in FIG. 1, FIG. 2 shows a single test detector 21, optically coupled to respective waveguides 131, 132, and 133 by means of waveguides 241, 242, and 243. (Substrate 11 and components 121, 122, and 123 are as described above with respect to FIG. 1.) In this arrangement, positive testing of a detector 121, 122, or 123 requires that light be inserted in a single waveguide 131, 132, or 133, while all others remain essentially free of light input.

Figure 3:
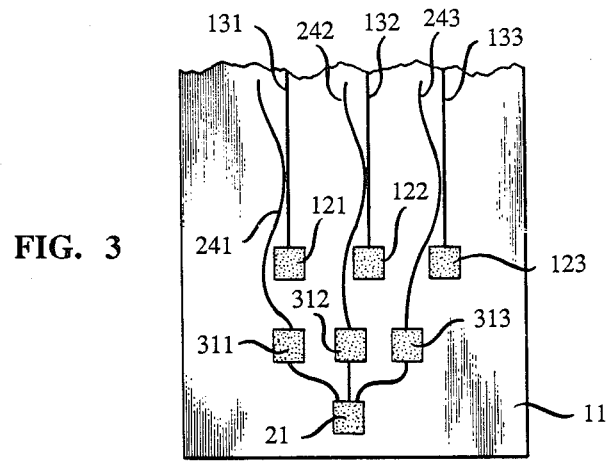

Yet another alternative is shown in FIG. 3 where, in addition to the features shown in FIG. 2, on/off switches 311, 312, and 313 are shown. In this arrangement it is no longer necessary, for testing purposes, to essentially exclude light from all but one of the waveguides 131, 132, and 133, selectivity being provided by having exactly one of switches 311, 312, and 313 set to permit light to pass. Contemplated optical switches need not be fast-acting, thermally activated or liquid-crystal switches being adequate, for example.

Figure 4:
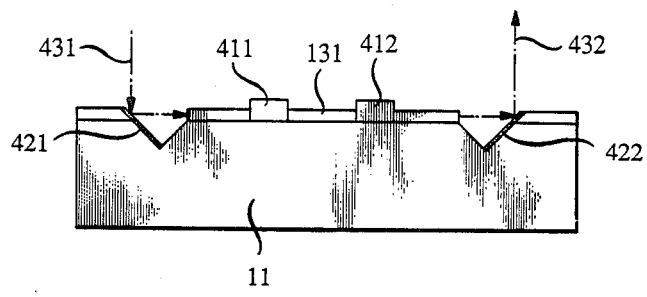
FIG. 4 and 5 are schematic cross-sectional representations of articles illustrating further preferred aspects of the invention.

While, in accordance with FIG. 1-3, waveguides of interest are tapped into by evanescent-field coupling, other means such as, e.g. reflective taps may be used, and such means may also be provided for insertion of optical test radiation. For example, as shown in FIG. 4, a substrate 11 bearing waveguide 131 and optical component devices 411 and 412 may be provided with reflective surface coatings 421 and 422 in suitably shaped V-grooves, permitting light insertion (431) and extraction (432).

Figure 5:
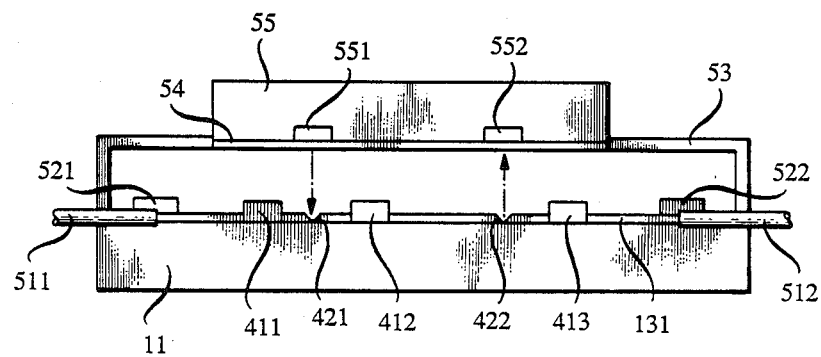

As optical testing is of interest also as applied to encapsulated devices, e.g., in field testing, a device encapsulation may be adapted to facilitate insertion and/or extraction of test radiation. Specifically, as illustrated by FIG. 5, an encapsulated article may include substrate 11, optical fibers 511 and 512, optical waveguide 131, fastener-alignment blocks 521 and 522, optical component devices 411, 412, and 413, and lid 53 with window 54.

Testing in the field may be facilitated further by the use of a test set 55, which is readily fitted to window 54 so that light sources 551 on the test set are lined up with light-sensitive test points 421 on the article and/or vice-versa as illustrated by of light-emitting test point 422 and sensor 552. In this fashion, active as well as passive tests can be carried out either while an article is disconnected for servicing or while the article is in operation.

While field testing by means of a test set as described above typically involves human interaction, installed devices may also provide for self-test capability, e.g., in the fashion described above in the context of device manufacture and in connection with FIG. 1-3. Conversely, use of a test set may be automated for incorporation into assembly-line manufacture, a benefit of the invention being realized in terms of ease of communication between optical components of the test set and test features on articles being manufactured.

I claim:

1. An article designed to perform at least one function in accordance with and within limits of a design specification, said article comprising at least one substrate-supported optical waveguide and a plurality of devices, CHARACTERIZED IN THAT said article comprises means included solely for facilitating detection of malfunctioning or ascertainment of proper functioning in accordance with and within limits of said specification, said means being permanently included in said article and not contributing to the performance of said function, and said means providing for a path for optical energy to be detected.

2. The article of claim 1, said path being different from the paths associated with the performance of said function.

3. The article of claim 1, said means providing optical access to said waveguide.

4. The article of claim 1, said means providing optical access to a device.

5. The article of claim 1, said means comprising a second waveguide in side-by-side coupling relationship with said first waveguide.

6. The article of claim 1, said means comprising a reflector.

7. The article of claim 1, said means comprising an optical switch.

8. The article of claim 1, said means being designed for the insertion of optical energy into said article.

9. The article of claim 1, said means being designed for the emission of optical energy from said article.

10. The article of claim 1, said means being designed for the detection of optical energy.

11. The article of claim 1, said article comprising an encapsulation which at least in part is transparent to optical radiation.

12. A method for manufacturing an article which is designed to perform at least one function in accordance with and within limits of a design specification, said method comprising the fabrication of at least one substrate-supported optical waveguide and of a plurality of devices, CHARACTERIZED IN THAT said method comprises functional testing utilizing testing means included in said article, said testing means being permanently included in said article and not contributing to the performance of said function, and said means providing for a path for optical energy to be detected.

13. A method of signal transmission, said method comprising the operation of an article designed to perform at least one function in accordance with and within limits of a design specification, said article comprising at least one substrate-supported optical waveguide and a plurality of devices, CHARACTERIZED IN THAT said method comprises functional testing utilizing testing means included in said article, said testing means being permanently included in said article and not contributing to the performance of said function, and said means providing for a path for optical energy to be detected.

14. The method of claim 13, said method comprising the use of a test set, said test set comprising an optical component in communication with said testing means.

15. The method of claim 14, said communication being via a transparent portion of an encapsulation of said article.

* * * * *